US008843364B2

(12) United States Patent
Mysore et al.

(10) Patent No.: US 8,843,364 B2
(45) **Date of Patent: *Sep. 23, 2014**

(54) LANGUAGE INFORMED SOURCE SEPARATION

(75) Inventors: Gautham J. Mysore, San Francisco, CA (US); Paris Smaragdis, Urbana, IL (US)

(73) Assignee: Adobe Systems Incorporated, San Jose, CA (US)

(*) Notice: Subject to any disclaimer, the term of this patent is extended or adjusted under 35 U.S.C. 154(b) by 163 days.

This patent is subject to a terminal disclaimer.

(21) Appl. No.: 13/408,934

(22) Filed: Feb. 29, 2012

(65) Prior Publication Data

US 2013/0226558 A1 Aug. 29, 2013

(51) Int. Cl.
*G06F 17/21* (2006.01)

(52) U.S. Cl.
USPC .............................. 704/10; 704/226; 704/200

(58) Field of Classification Search
CPC ......... G06F 17/21; G06F 15/00; G06L 21/02; G06L 21/00; G10L 25/00
USPC .................... 704/226, 238, 240, 256, 200, 10
See application file for complete search history.

(56) References Cited

U.S. PATENT DOCUMENTS 5,345,536 A 9/1994 Hoshimi et al.
6,493,667 B1 12/2002 de Souza et al.
7,584,102 B2 9/2009 Hwang et al.
7,664,640 B2 2/2010 Webber
7,664,643 B2 2/2010 Gopinath et al.
7,899,669 B2 3/2011 Gadbois
8,010,347 B2 8/2011 Ricci et al.
8,036,884 B2 10/2011 Lam et al.
8,521,518 B2 * 8/2013 Jung et al. .................. 704/200.1
8,554,553 B2 * 10/2013 Mysore et al. ................ 704/226
2001/0037195 A1 11/2001 Acero et al.
2002/0135618 A1 9/2002 Maes et al.
2002/0169600 A1 11/2002 Busayapongchai et al.
2004/0107100 A1 * 6/2004 Lu et al. ........................ 704/238
2004/0186717 A1 9/2004 Savic et al.
2006/0178887 A1 8/2006 Webber
2007/0100623 A1 5/2007 Hentschel et al.
2008/0052074 A1 2/2008 Gopinath et al.
2009/0006038 A1 1/2009 Jojic et al.
2010/0082340 A1 4/2010 Nakadai et al.
2010/0195770 A1 8/2010 Ricci et al.
2011/0125496 A1 5/2011 Asakawa et al.

(Continued)

OTHER PUBLICATIONS

Mysore et al., "Non-negative Hidden Markov Modeling of Audio with Application to Source Separation", 2010, Springer-Verlag Berlin Heidelberg, LNCS 6365, pp. 140-148.*

(Continued)

*Primary Examiner* — Vijay B Chawan
*Assistant Examiner* — Seong-Ah A Shin
(74) *Attorney, Agent, or Firm* — Wolfe-SBMC

(57) ABSTRACT

Methods and systems for non-negative hidden Markov modeling of signals are described. For example, techniques disclosed herein may be applied to signals emitted by one or more sources. The modeling may be constrained according to high level information. In some embodiments, methods and systems may enable the separation of a signal's various components. As such, the systems and methods disclosed herein may find a wide variety of applications. In audio-related fields, for example, these techniques may be useful in music recording and processing, source separation/extraction, noise reduction, teaching, automatic transcription, electronic games, audio search and retrieval, and many other applications.

20 Claims, 8 Drawing Sheets

(56) References Cited

U.S. PATENT DOCUMENTS

| | | | | |
|---|---|---|---|---|
| 2013/0132082 | A1* | 5/2013 | Smaragdis | 704/240 |
| 2013/0132085 | A1* | 5/2013 | Mysore et al. | 704/256.1 |
| 2013/0226858 | A1* | 8/2013 | Smaragdis et al. | 706/52 |

OTHER PUBLICATIONS

"Non-Final Office Action", U.S. Appl. No. 13/031,357, (Jan. 10, 2013), 15 pages.

Non-negative Hidden Markov Modeling of Audio with Application to Source Separation (Conference Paper); Authors: Mysore, G. J., P. Smaragdis, and B. Raj; International Conference on Latent Variable Analysis and Signal Separation (LVA / ICA); Publicaton Date: Sep. 2010.

L. Benaroya, F. Bimbot, and R. Gribonval. Audio source separation with a single sensor. IEEE TASLP, 14(1), Jan. 2006.

Z. Ghahramani and M. Jordan. Factorial hidden Markov models. Machine Learning, 1997.

J. R. Hershey, T. Kristjansson, S. Rennie, and P. A. Olsen. Single channel speech separation using factorial dynamics. In NIPS, 2007.

A. Ozerov, C. Fevotte, and M. Charbit. Factorial scaled hidden markov model for polyphonic audio representation and source separation. In WASPAA, Oct. 2009.

L. R. Rabiner. A tutorial on hidden markov models and selected applications in speech recognition. Proceedings of the IEEE, 77(2):257-286, 1989.

P. Smaragdis and J. C. Brown. Non-negative matrix factorization for polyphonic music transcription. In WASPAA, 2003.

P. Smaragdis, B. Raj, and M. Shashanka. Probabilistic latent variable model for acoustic modeling. In Advances in models for acoustic processing, NIPS, 2006.

E. Vincent, R. Gribonval, and C. F'evotte. Performance measurement in blind audio source separation. IEEE TASLP, 14(4), Jul. 2006.

T. Virtanen. Speech recognution using factorial hidden Markov models for separation in the feature space. In Proceedings of Interspeech, 2006.

The Markov selection model for concurrent speech recognition; Authors: Smaragdis, P.; Raj, B.; 2010 IEEE International Workshop on Machine Learning for Signal Processing (MLSP), pp. 214-219; Issue date: Aug. 29 2010-Sep. 1 2010.

Raj, B., P. Smaragdis. Latent Variable Decomposition of Spectrograms for Single Channel Speaker Separation, in 2005 IEEE Workshop on Applications of Signal Processing to Audio and Acoustics (WASPAA 2005).

Virtanen, T. and A. T. Cemgil. Mixtures of Gamma Priors for Non-Negative Matrix Factorization Based Speech Separation, in 8th International Conference on Independent Component Analysis and Signal Separation (ICA 2009).

Smaragdis, P., M. Shashanka, and B. Raj. A sparse nonparametric approach for single channel separation of known sounds, Neural Information Processing Systems (NIPS) 2009.

Hofmann, T. Probabilistic Latent Semantic Indexing, in 1999 ACM SIGIR Special Interest Group on Information Retrieval Conference (SIGIR 1999).

Lee D.D., and H.S. Seung. Learning the parts of objects by non-negative matrix factorization. Nature 401, 1999.

Bourlard, H. and N. Morgan, Hybrid HMM/ANN systems for speech recognition: Overview and new research directions, LNCS, Springer Berlin, vol. 1387, 1998, pp. 389-417.

Rabiner, L.R. and B. H. Juang. An introduction to hidden Markov models. IEEE Acoustics, Speech and Signal Processing (ASSP) Magazine, 3(1):4-16, 1986.

Mysore, G. J. A Non-negative Framework for Joint Modeling of Spectral Structure and Temporal Dynamics in Sound Mixtures, Thesis, published on Jun. 2010, Stanford University.

U.S. Appl. No. 13/031,353, filed Feb. 21, 2011, Adobe Systems Incorporated, all pages.

U.S. Appl. No. 13/031,357, filed Feb. 21, 2011, Adobe Systems Incorporated, all pages.

Paris Smaragdis, et al., "The Markov Selection Model for Concurrent Speech Recognition," 6 pages, 2010, Machine Learning for Signal Processing (MLSP), 2010 IEEE International Workshop.

Paris Smaragdis, et al., "Supervised and Semi-Supervised Separation of Sounds from Single-Channel Mixtures," 8 pages, ICA'07 Proceedings of the 7th international conference on Independent component analysis and signal separation, 2007.

John R. Hershey, et al. "Super-human multi-talker speech recognition: A graphical modeling approach," 2008 Elsevier Ltd., 22 pages.

Tuomas Virtanen, Tampere University of Technology, Institute of Signal Processing, "Speech Recognition Using Factorial Hidden Markov Models for Separation in the Feature Space," Interspeech Sep. 17-21, 2006, 4 pages.

"Corrected Notice of Allowance", U.S. Appl. No. 13/031,357, Sep. 9, 2013, 2 pages.

"Non-Final Office Action", U.S. Appl. No. 13/031,353, Sep. 9, 2013, 23 pages.

Schmidt, et al., "Single-Channel Speech Separation using Space Non-Negative Matrix Factorization", Proceedings of Interspeech, 2006, 4 pages.

"Notice of Allowance", U.S. Appl. No. 13/031,357, (Jun. 28, 2013), 9 pages.

"Final Office Action", U.S. Appl. No. 13/031,353, May 15, 2014, 21 pages.

* cited by examiner

LANGUAGE INFORMED SOURCE SEPARATION

BACKGROUND

This specification relates to signal processing, and, more particularly, to systems and methods for language informed source separation.

Statistical signal modeling is a challenging technical field, particularly when it deals with mixed signals—i.e., signals produced by two or more sources.

In audio processing, most sounds may be treated as a mixture of various sound sources. For example, recorded music typically includes a mixture of overlapping parts played with different instruments. Also, in social environments, multiple people often tend to speak concurrently—referred to as the “cocktail party effect.” In fact, even so-called single sources can actually be modeled a mixture of sound and noise.

The human auditory system has an extraordinary ability to differentiate between constituent sound sources. This basic human skill remains, however, a difficult problem for computers.

SUMMARY

The present specification is related to systems and methods for language informed non-negative hidden Markov modeling. In some embodiments, methods and systems may enable the separation of a signal’s various components that are attributable to different sources. As such, the systems and methods disclosed herein may find a wide variety of applications. In audio-related fields, for instance, these techniques may be useful in music recording and processing, source extraction, noise reduction, teaching, automatic transcription, electronic games, audio search and retrieval, and many other applications.

In some embodiments, methods and systems described herein provide a language informed non-negative hidden Markov model (N-HMM) for a single source that jointly models the spectral structure and temporal dynamics of that source. Rather than learning a single dictionary of spectral vectors for a given source, a method or system may construct two or more dictionaries that characterize the spectral structure of the source. In addition, a method or system may build a Markov chain that characterizes the temporal dynamics of the source. In some embodiments, the temporal dynamics may be constrained according to high level information.

For example, an illustrative N-HMM-based implementation may include a “training” stage followed by an “application” or “evaluation” stage. In the N-HMM training stage, a method may process a sound sample from the source. This sound sample may be pre-recorded, in which case the training stage may be performed “offline.” Additionally or alternatively, the sound sample may be a portion of a “live” occurrence; thus allowing the training stage to take place “online” or in “real-time.”

An N-HMM training method may store a time-frequency representation or spectrogram of a signal emitted by a source and it may construct a dictionary for each segment of the spectrogram. Each dictionary for each segment may include one or more spectral components. The N-HMM training method may also compute probabilities of transition between dictionaries based on the spectrogram. In addition, the N-HMM training method may build a model for a source based on the constructed dictionaries and their probabilities of transition. In some embodiments, individual N-HMM models may be built at the word level, note level, or similar level. The individual N-HMM models may be combined together into a single source dependent N-HMM model. The probabilities of transition may be constrained according to high level information (e.g., language model, music theory, rules, etc.).

In an N-HMM application or evaluation phase, a method may store a model corresponding to a source, where the model includes spectral dictionaries and a transition matrix. Each spectral dictionary may have one or more spectral components, and the transition matrix may represent probabilities of transition between spectral dictionaries. The N-HMM application method may then receive a first time-varying signal from the modeled source, or another source that may be approximated by the modeled source, generate a spectrogram of the time-varying signal, and calculate a contribution of a given spectral dictionary to the spectrogram based on the model. The N-HMM application method may then process one or more contributions separately if so desired. Additionally, the N-HMM application method may combine one or more processed or unprocessed contributions into a second time-varying signal.

In other embodiments, methods and systems disclosed herein provide a non-negative factorial hidden Markov model (N-FHMM) for sound mixtures, which may combine N-HMM models of individual sources. This model may incorporate the spectral structure and temporal dynamics of each single source.

Similarly as discussed above, some embodiments of an N-FHMM-based implementation may also include a “training” phase followed by an “application” phase. An N-FHMM training phase or method may compute a spectrogram for each source of a sound mixture based on training data and create models for the several sources. The training data may be obtained and/or processed offline and/or online. In some cases, the training phase may construct several dictionaries to explain an entire spectrogram such that a given time frame of the spectrogram may be explained mainly by a single dictionary. Additionally or alternatively, each model for a given source may include a dictionary for each time frame of the given source’s computed spectrogram, and the dictionary may include one or more spectral components. Each model may also include a transition matrix indicating probabilities of transition between dictionaries.

An N-FHMM application phase or method may store a model corresponding to each sound source, compute a spectrogram of a time-varying signal including a sound mixture generated by individual ones of the plurality of sound sources, and determine a weight for each of the individual sound sources based on the spectrogram of the time-varying signal. For example, the application method may calculate or estimate weights for each spectral component of the active dictionary for each source in each segment or time frame of the spectrogram. The N-FHMM application method may also calculate contributions of each dictionary for each of the individual sound sources based on the model and the estimated weights and create a mask for one or more of the individual sound sources based on the calculation operation.

In some embodiments, the mask may be applied to the one or more of the individual sound sources to separate individual sound sources from other sources. Once separated from others, an individual source may be separately or independently processed. If so desired, processed and/or unprocessed sources may then be combined.

Figure 1:
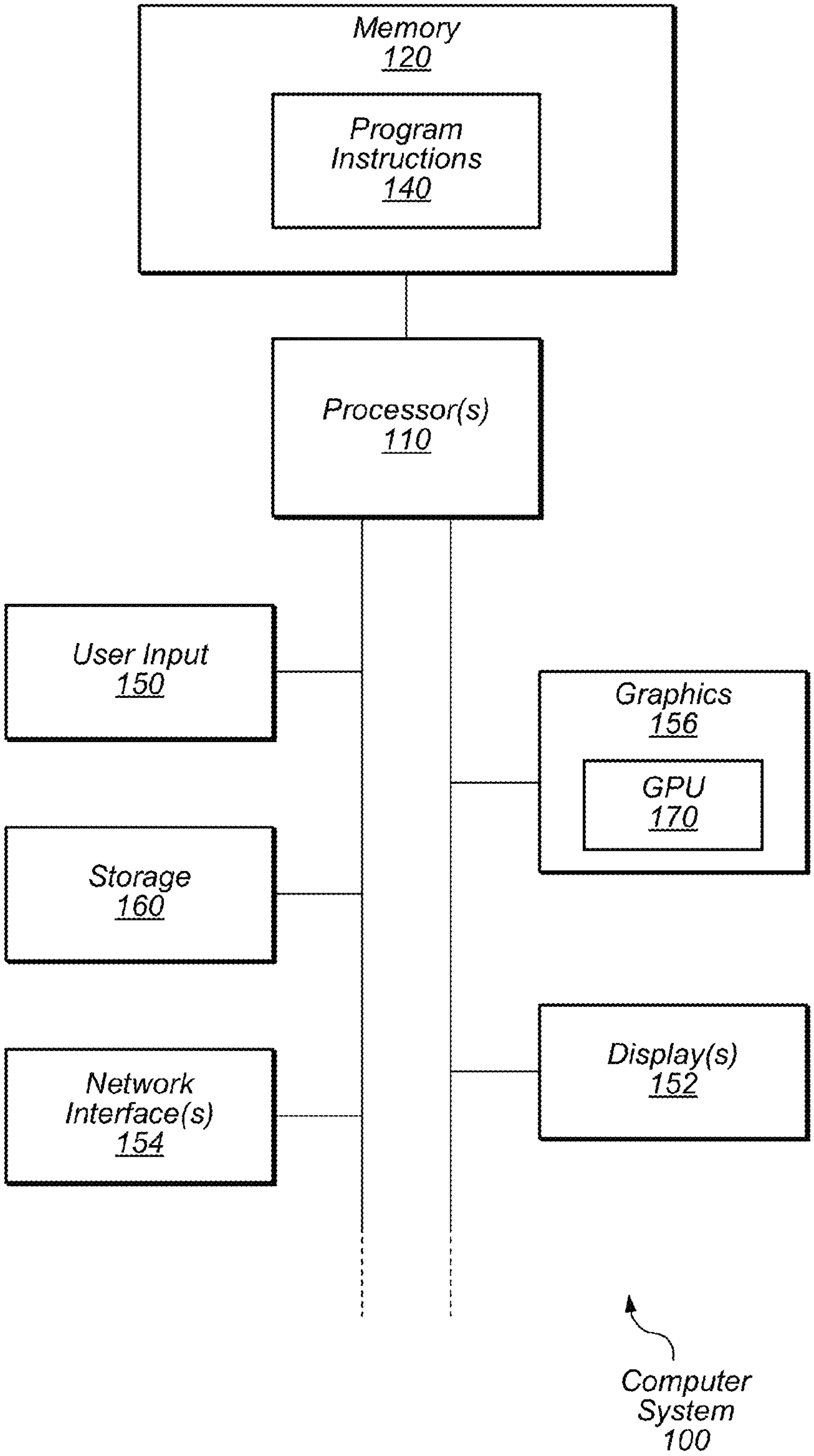
FIG. 1 is a block diagram of an illustrative computer system or device configured to implement some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. The headings used herein are for organizational purposes only and are not meant to be used to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

"First," "Second," etc. As used herein, these terms are used as labels for nouns that they precede, and do not imply any type of ordering (e.g., spatial, temporal, logical, etc.). For example, for a signal analysis module estimating a weight of each of a plurality of sources in a sound mixture based on a model of the sources, the terms "first" and "second" sources can be used to refer to any two of the plurality of sources. In other words, the "first" and "second" sources are not limited to logical sources 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Signal." Throughout the specification, the term "signal" may refer to a physical signal (e.g., an acoustic signal) and/or to a representation of a physical signal (e.g., an electromagnetic signal representing an acoustic signal). In some embodiments, a signal may be recorded in any suitable medium and in any suitable format. For example, a physical signal may be digitized, recorded, and stored in computer memory. The recorded signal may be compressed with commonly used compression algorithms. Typical formats for music or audio files may include WAV, OGG, AIFF, RAW, AU, AAC, MP4, MP3, WMA, RA, etc.

"Source." The term "source" refers to any entity (or type of entity) that may be appropriately modeled as such. For example, a source may be an entity that produces, interacts with, or is otherwise capable of producing or interacting with a signal. In acoustics, for example, a source may be a musical instrument, a person's vocal cords, a machine, etc. In some cases, each source—e.g., a guitar—may be modeled as a plurality of individual sources—e.g., each string of the guitar may be a source. In other cases, entities that are not otherwise capable of producing a signal but instead reflect, refract, or otherwise interact with a signal may be modeled as a source—e.g., a wall or enclosure. Moreover, in some cases two different entities of the same type—e.g., two different pianos—may be considered to be the same "source" for modeling purposes.

"Mixed signal," "Sound mixture." The terms "mixed signal" or "sound mixture" refer to a signal that results from a combination of signals originated from two or more sources into a lesser number of channels. For example, most modern music includes parts played by different musicians with different instruments. Ordinarily, each instrument or part may be recorded in an individual channel. Later, these recording channels are often mixed down to only one (mono) or two (stereo) channels. If each instrument were modeled as a source, then the resulting signal would be considered to be a mixed signal. It should be noted that a mixed signal need not be recorded, but may instead be a "live" signal, for example, from a live musical performance or the like. Moreover, in some cases, even so-called "single sources" may be modeled as producing a "mixed signal" as mixture of sound and noise.

Introduction

This specification first presents an illustrative computer system or device, as well as an illustrative signal analysis module that may implement certain embodiments of methods disclosed herein. The specification then discloses techniques for language informed modeling of signals originated from single sources, followed by techniques for language informed modeling of signals originated from multiple sources. Various examples and applications for each modeling scenario are also disclosed. Some of these techniques may be implemented, for example, by a signal analysis module or computer system.

In some embodiments, these techniques may be used in music recording and processing, source separation, source extraction, noise reduction, teaching, automatic transcription, electronic games, audio search and retrieval, and many other applications. Although certain embodiments and applications discussed herein are in the field of audio, it should be noted that the same or similar principles may also be applied in other fields. While many of the described examples are in the context of speech separation using language models, the disclosed techniques may apply equally in other contexts in which high level structure information is available. One such other example is to incorporate music theory into the disclosed techniques to assist in music separation.

Throughout the specification, the term "signal" may refer to a physical signal (e.g., an acoustic signal) and/or to a representation of a physical signal (e.g., an electromagnetic signal representing an acoustic signal). In some embodiments, a signal may be recorded in any suitable medium and in any suitable format. For example, a physical signal may be digitized, recorded, and stored in computer memory. The recorded signal may be compressed with commonly used compression algorithms. Typical formats for music or audio files may include WAV, OGG, AIFF, RAW, AU, AAC, MP4, MP3, WMA, RA, etc.

The term "source" refers to any entity (or type of entity) that may be appropriately modeled as such. For example, a source may be an entity that produces, interacts with, or is otherwise capable of producing or interacting with a signal. In acoustics, for example, a source may be a musical instrument, a person's vocal cords, a machine, etc. In some cases, each source—e.g., a guitar—may be modeled as a plurality of individual sources—e.g., each string of the guitar may be a source. In other cases, entities that are not otherwise capable of producing a signal but instead reflect, refract, or otherwise interact with a signal may be modeled a source—e.g., a wall or enclosure. Moreover, in some cases two different entities of the same type—e.g., two different pianos—may be considered to be the same "source" for modeling purposes.

The term "mixed signal" or "sound mixture" refers to a signal that results from a combination of signals originated from two or more sources into a lesser number of channels. For example, most modern music includes parts played by different musicians with different instruments. Ordinarily, each instrument or part may be recorded in an individual channel. Later, these recording channels are often mixed down to only one (mono) or two (stereo) channels. If each instrument were modeled as a source, then the resulting signal would be considered to be a mixed signal. It should be noted that a mixed signal need not be recorded, but may instead be a "live" signal, for example, from a live musical performance or the like. Moreover, in some cases, even so-called "single sources" may be modeled as producing a "mixed signal" as mixture of sound and noise. As another example, a sound mixture may include signals originating from two different speakers, as in a cocktail party situation.

In the following detailed description, numerous specific details are set forth to provide a thorough understanding of claimed subject matter. However, it will be understood by a person of ordinary skill in the art in light of this specification that claimed subject matter may be practiced without necessarily being limited to these specific details. In some instances, methods, apparatuses or systems that would be known by a person of ordinary skill in the art have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

A Computer System or Device

FIG. 1 is a block diagram showing elements of an illustrative computer system 100 that is configured to implement embodiments of the systems and methods described herein. The computer system 100 may include one or more processors 110 implemented using any desired architecture or chip set, such as the SPARC™ architecture, an x86-compatible architecture from Intel Corporation or Advanced Micro Devices, or another architecture or chipset capable of processing data. Any desired operating system(s) may be run on the computer system 100, such as various versions of Unix, Linux, Windows® from Microsoft Corporation, MacOS® from Apple Inc., or any other operating system that enables the operation of software on a hardware platform. The processor(s) 110 may be coupled to one or more of the other illustrated components, such as a memory 120, by at least one communications bus.

In some embodiments, a specialized graphics card or other graphics component 156 may be coupled to the processor(s) 110. The graphics component 156 may include a graphics processing unit (GPU) 170, which in some embodiments may be used to perform at least a portion of the techniques described below. Additionally, the computer system 100 may include one or more imaging devices 152. The one or more imaging devices 152 may include various types of raster-based imaging devices such as monitors and printers. In an embodiment, one or more display devices 152 may be coupled to the graphics component 156 for display of data provided by the graphics component 156.

In some embodiments, program instructions 140 that may be executable by the processor(s) 110 to implement aspects of the techniques described herein may be partly or fully resident within the memory 120 at the computer system 100 at any point in time. The memory 120 may be implemented using any appropriate medium such as any of various types of ROM or RAM (e.g., DRAM, SDRAM, RDRAM, SRAM, etc.), or combinations thereof. The program instructions may also be stored on a storage device 160 accessible from the processor(s) 110. Any of a variety of storage devices 160 may be used to store the program instructions 140 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 160 may be coupled to the processor(s) 110 through one or more storage or I/O interfaces. In some embodiments, the program instructions 140 may be provided to the computer system 100 via any suitable computer-readable storage medium including the memory 120 and storage devices 160 described above.

The computer system 100 may also include one or more additional I/O interfaces, such as interfaces for one or more user input devices 150. In addition, the computer system 100 may include one or more network interfaces 154 providing access to a network. It should be noted that one or more components of the computer system 100 may be located remotely and accessed via the network. The program instructions may be implemented in various embodiments using any desired programming language, scripting language, or combination of programming languages and/or scripting languages, e.g., C, C++, C#, Java™, Perl, etc. The computer system 100 may also include numerous elements not shown in FIG. 1, as illustrated by the ellipsis.

A Signal Analysis Module

Figure 2:
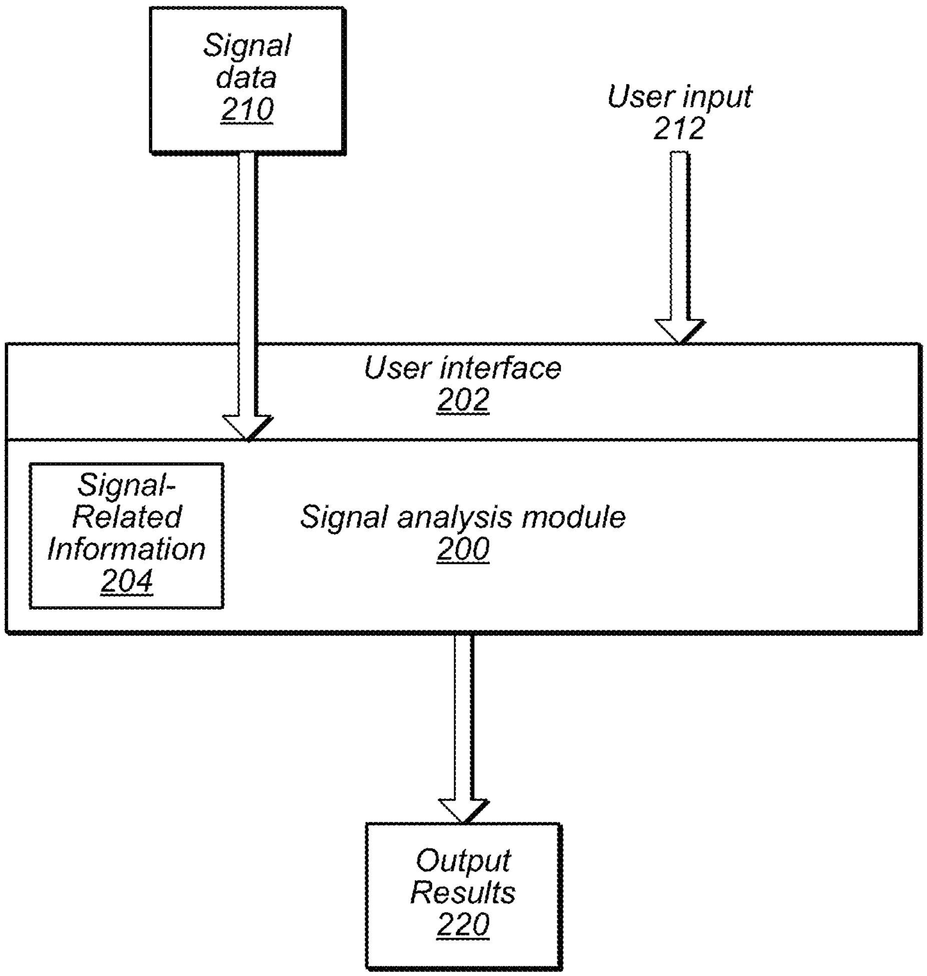
FIG. 2 is a block diagram of an illustrative signal analysis module according to some embodiments.

In some embodiments, a signal analysis module may be implemented by processor-executable instructions (e.g., instructions 140) stored on a medium such as memory 120 and/or storage device 160. FIG. 2 shows an illustrative signal analysis module that may implement certain embodiments disclosed herein. In some embodiments, module 200 may provide a user interface 202 that includes one or more user interface elements via which a user may initiate, interact with, direct, and/or control the method performed by module 200. Module 200 may be operable to obtain digital signal data for a digital signal 210, receive user input 212 regarding the signal data, analyze the signal data and/or the input, and output analysis results for the signal data 220. In an embodiment, the module may include or have access to additional or auxiliary signal-related information 204—e.g., a collection of representative signals, model parameters, etc.

Signal analysis module 200 may be implemented as or in a stand-alone application or as a module of or plug-in for a signal processing application. Examples of types of applications in which embodiments of module 200 may be implemented may include, but are not limited to, signal (including sound) analysis, source separation, characterization, search, processing, and/or presentation applications, as well as applications in security or defense, educational, scientific, medical, publishing, broadcasting, entertainment, media, imaging, acoustic, oil and gas exploration, and/or other applications in which signal analysis, characterization, representation, or presentation may be performed. Specific examples of applications in which embodiments may be implemented include, but are not limited to, Adobe® Soundbooth® and Adobe® Audition®. Module 200 may also be used to display, manipulate, modify, classify, and/or store signals, for example to a memory medium such as a storage device or storage medium.

Single Sources

In some embodiments, signal analysis module 200 may implement a language informed single source model such as described in this section. This portion of the specification discloses a language informed non-negative hidden Markov model (N-HMM). In some embodiments, the N-HMM model jointly learns several spectral dictionaries as well as a Markov chain that describes the structure of changes between these dictionaries. In one embodiment, the Markov chain is constrained according to high level information, such as a language model.

In the sections that follow, an overview of an N-HMM-based method is presented and a language informed N-HMM model is disclosed.

Overview of a Language Informed N-HMM-Based Method

Figure 3:
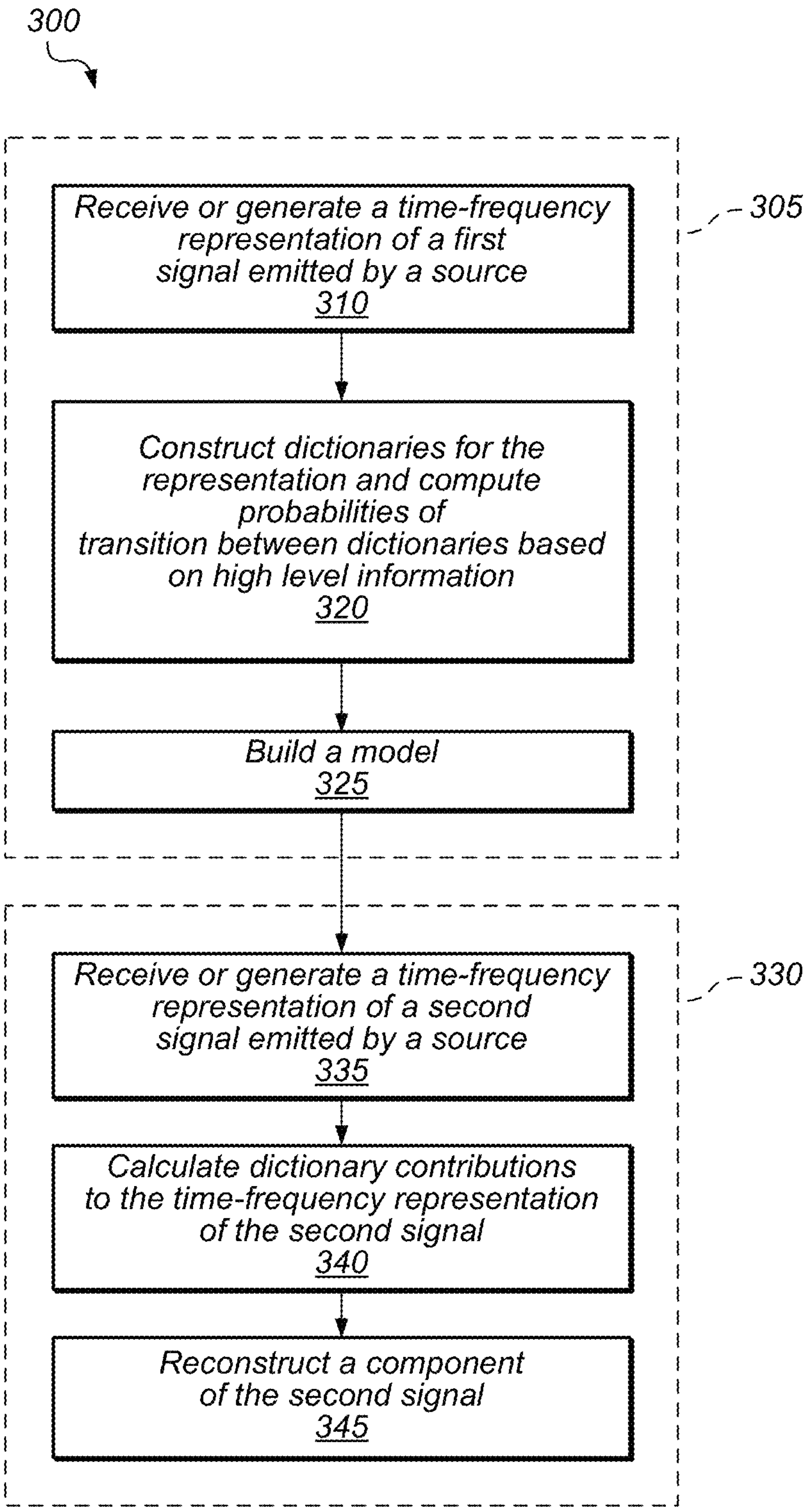
FIG. 3 is a flowchart of a method for a language informed non-negative hidden Markov model (N-HMM) of a single source according to some embodiments.

Referring to FIG. 3, a flowchart of method 300 for a language informed non-negative hidden Markov model (N-HMM) for a single source is depicted according to some embodiments. For example, N-HMM method 300 may be performed, at least in part, by signal analysis module 200 of FIG. 2. Generally, N-HMM method 300 may be split into two stages: training stage 305 and application (or evaluation) stage 330. Although N-HMM method 300 is illustrated showing application stage 330 immediately following training stage 305, it should be noted that these stages may be independently performed at different times and by different entities. In some implementations, training stage 305 may take place "offline" based on training data, and application stage 330 may be executed "online" based on data desired to be processed. In other implementations, both training stage 305 and application stage 330 may be executed online.

At 310 of training phase 305, N-HMM method 300 receives and/or generates a spectrogram of a first signal emitted by a source. The signal may be a previously recorded training signal. Additionally or alternatively, the signal may be a portion of a live signal being received at signal analysis module 200. The signal may be the same signal that will be processed in application stage 335 or an entirely different signal, whether live or pre-recorded.

In some embodiments, the spectrogram may be a spectrogram generated, for example, as the magnitude of the short time Fourier transform (STFT) of a signal. Furthermore, the source may be any source suitable for modeling as a single source. The decision of whether to model a signal as having been originated by a single source or by multiple sources may be a design choice, and may vary depending upon the application.

In some embodiments, the first signal may include speech. In one embodiment, the speech containing first signal may be a single word emitted by the source. Or, the first signal may be partitioned into a number of individual words such that each word may be modeled at the word level. Such partitioning may be before, after, or concurrent with any spectrogram generation. In other embodiments, the first signal may be or may be partitioned into a single phoneme or a single sentence of speech, depending on the desired resolution. Accordingly, word level, phoneme level, and/or sentence level models may be generated by method 300.

At 320, N-HMM method 300 may construct two or more dictionaries to explain the spectrogram (e.g., of the signal, word, phoneme, and/or sentence) such that, at a given time frame, the spectrogram may be explained mainly by a single dictionary. In this case, multiple segments in different parts of the spectrogram may be explained by the same dictionary. Additionally or alternatively, method 300 may construct a dictionary for each segment of the spectrogram. The various segments may be, for example, time frames of the spectrogram. Further, each dictionary may include one or more spectral components of the spectrogram. Particularly in acoustic applications, this operation may allow an N-HMM model to account for the non-stationarity of audio by collecting multiple sets of statistics over a given spectrogram, rather than amalgamating the statistics of the entire spectrogram into one set. Each segment of the spectrogram may be represented by a linear combination of spectral components of a single dictionary. In some embodiments, the number of dictionaries and the number of spectral components per dictionary may be user-selected. Additionally or alternatively, these variables may be automatically selected based on an optimization algorithm or the like.

In the example using word level spectrograms, two or more dictionaries may be generated to explain the spectrogram of that word. In various embodiments, multiple dictionaries may be generated for each word of a plurality of words for a respective source (e.g., a speaker, a musical instrument, etc.). For example, fifty words may exist as part of training data. In such an example, a word level model, each having multiple dictionaries, may be created for each of those fifty words for the single source. Thus, in a scenario in which ten dictionaries are generated to explain each of the fifty words, five hundred total dictionaries result. Note that the number of dictionaries used to describe the spectrogram of a given word may be numbers other than ten. Moreover, the number of dictionaries used to describe one word may be a different number than the number of dictionaries used to describe another word. Continuing the simple numerical example above, the five hundred dictionaries may be combined into a single dictionary at block 320, or, in another embodiment, at block 325.

As shown in blocks 310 and 320, an N-HMM method 300 may involve constructing dictionaries for a spectrogram. The spectrogram of a sound source may be viewed as a histogram of "sound quanta" across time and frequency. Each column of a spectrogram is the magnitude of the Fourier transform over a fixed window of an audio signal. As such, each column describes the spectral content for a given time frame. In some embodiments, the spectrogram may be modeled as a linear combination of spectral vectors from a dictionary using a factorization method.

In some embodiments, a factorization method may include two sets of parameters. A first set of parameters, P(f|z), is a multinomial distribution of frequencies for latent component z, and may be viewed as a spectral vector from a dictionary. A given spectral vector may be a discrete distribution. A second set of parameters, $P(z_t)$, is a multinomial distribution of weights for the aforementioned dictionary elements at time t. Given a spectrogram, these parameters may be estimated using an Expectation-Maximization (EM) algorithm or some other suitable algorithm. Because each column of the spectrogram may be modeled as a linear combination of spectral components, time frame t (modeled by state q) may be given by $$P(f_t \mid q_t) = \sum_{z_t} P(f_t \mid z_t, q_t) P(z_t \mid q_t), \qquad \text{Eq. (1)}$$

where $P(z_t|q_t)$ is a discrete distribution of mixture weights for time t. The transitions between states may be modeled with a Markov chain, given by $P(q_{t+1}|q_t)$, as described at 320.

Also at 320, N-HMM method 300 may compute probabilities of transition between dictionaries. In some embodiments, the probabilities of transition may be modeled as a Markov chain. These probabilities may be expressed, for example, in the form of a transition matrix. In some embodiments, a transition matrix may be generated for each word model such that each transition matrix corresponds to a given word's multiple dictionaries. In other embodiments, a single transition matrix may be generated that reflects probabilities of transition among the various dictionaries of the various word models. Or, in some embodiments, individual transition matrices may be combined into a single composite transition matrix.

The single composite transition matrix and/or individual transition matrices may be constrained according to high level information that defines valid transitions. Such constraints may result in increased sparsity of the transition matrix. In one embodiment, individual transition matrices that correspond to a single word may not be constrained but transitions between words may be constrained. In other embodiments, either or both of the individual matrices and a combined matrix that includes the individual matrices may be constrained. In such embodiments, transitions within words and/or transitions between words may be constrained. In one embodiment, the high level information may be a language model that defines a valid grammar. For instance, the language model may define a corpus of words and valid sequences of the words from the corpus.

An example language model can be seen in Table 1. The example model includes three word categories: Word 1, Word 2, and Word 3. The words in these categories may correspond to the individual words for which a plurality of dictionaries is generated. Thus, at 320, a word model that includes multiple dictionaries may be created for each of red, blue, green, grey, one, two, three, four, five, run, walk, and drive. For instance, for the word grey, one dictionary may exist for the letter 'g', one for the letter 'r', one for the letter 'e', and one letter for the letter 'y'. In the example of Table 1, the language model may dictate that a word from Word 1 is followed by a word from Word 2, which is followed by a word from Word 3. Moreover, the language model may dictate that once within a word, the word must complete before proceeding to the next word. Or, the language model may dictate that the word may or may not complete before proceeding to the next word. Note that the language model of Table 1 is one example of a language model. Other language models may be more complex and include thousands of possible words and may include rules according to proper English (or other language) grammar. In some embodiments, any word may transition to any word but some transitions may be more likely than others.

TABLE 1

| Example Language Model | | |
|---|---|---|
| Word 1 | Word 2 | Word 3 |
| Red | One | Run |
| Blue | Two | Walk |
| Green | Three | Drive |
| Grey | Four | |
| | Five | |

Consider a scenario in which the example language model of Table 1 is used to compute the probabilities of transition at block 320. If a word from category Word 1 begins with the letter 'r', then a near 100% of transition to spectral components (dictionary/state) for letter 'e' will follow along with zero or near zero probability of transition to other states. Near zero indicates that other states are possible, even if remote. The letter 'e' will be followed by a near 100% probability of transition to letter/state 'd' with corresponding zero or near zero probability of transition to other states. After completion of the word 'red', there may be an equal probability to transition to any of the words from category Word 2. But because of the language model constraints, it may be known that probabilities to transition to states other than 'o', 't', or 'f' may be near zero or zero, while probabilities to transition to states 'o', 't', or 'f' may not be near zero. In some examples, at the end of a word, it may be equally probable to go to any of the other valid words.

In another example using Table 1, consider a scenario in which the word form category Word 1 begins with 'g'. From the language model, only green or grey are valid words. Thus, the probability of transition to letter 'r' would be near 100%. Similarly, the probability of transition from 'r' to 'e' would likewise be near 100%. After 'e', however, each of states 'e' and 'y' may both be highly likely to account for both green and grey. As such, the probability of transition to 'e' may be near 50% as will the probability of transition to 'y'. Thus, in some embodiments, when a word begins with state 'g', probabilities may be computed for both 'green' and 'grey'. Probabilities for invalid words according to the language model may also be calculated, but as described, those probabilities may be zero or near zero. While the example of Table 1 is a simple example, the general principles of constraining the transition matrix based on high level information scales to larger, more complex high level information.

At 325, N-HMM method 300 may build a model based on the dictionaries and the probabilities of transition. In some embodiments, the model may also include parameters such as, for example, mixture weights, initial state probabilities, energy distributions, etc. These parameters may be obtained, for example, using an EM algorithm or some other suitable method as described in more detail below.

In an embodiment in which word level models were generated, each word level model, including multiple dictionaries and a transition matrix, may be combined with each other word level model into a single composite model for that source, also referred to as a single source dependent model. In some embodiments, constraining according to the high level information may occur at block 325 instead of or in addition to occurring at block 320. Constraining the single source dependent model according to the high level information may include constraining transitions between words (e.g., constraining transitions between the individual transition matrices). In one embodiment, constraining transitions between words may not include constraining within individual words. In other embodiments, transitions within individual words may likewise be constrained according to high level information.

At 335 of application phase 330, N-HMM method 300 may receive a second signal. In some embodiments, the second signal may be the same signal received at operation 310—whether the signal is "live" or pre-recorded. In other embodiments, the second signal may be different from the first signal. Moreover, the source may be the same source, another instance of same type of source, or a source similar to the same source modeled at operation 325. Similarly as in operation 310, N-HMM method 300 may calculate a time-frequency representation or spectrogram of the second signal.

At 340, N-HMM method 300 then calculates a contribution of a given dictionary to a time-frequency representation of the second signal based, at least in part, on the model built during training stage 305. Finally at 345, N-HMM method 300 reconstructs one or more signal components of second signal based, at least in part, on their individual contributions. In some embodiments, operation 345 reconstructs a signal component based on other additional model parameters such as, for example, mixture weights, initial state probabilities, energy distributions, etc.

As a result of operation 340, the various components of the second signal have now been individually identified, and as such may be separately processed as desired. Once one or more components have been processed, a subset (or all) of them may be once again combined to generate a modified signal. In the case of audio applications, for example, it may be desired to play the modified signal as a time-domain signal, in which case additional phase information may be obtained in connection with operation 335 to facilitate the transformation.

An N-HMM Model

Figure 4:
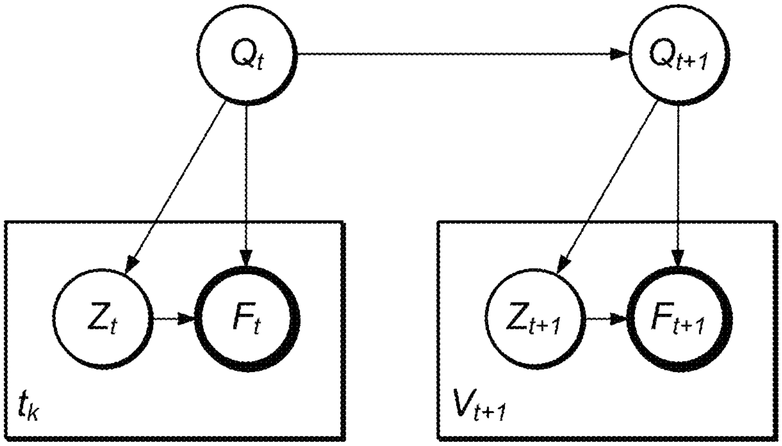
FIG. 4 is a graphical representation of an N-HMM model according to some embodiments.

Referring to FIG. 4, a graphical representation of an N-HMM model is depicted according to some embodiments. In this graphical representation, random variables are indicated by "nodes" and dependencies are indicated by arrows. The direction of an arrow indicates the direction of dependence of random variables. Nodes $F_t$ and $F_{t+1}$ represent observed random variables, while other nodes represent hidden random variables.

As illustrated, the model has a number of states, q, which may be interpreted as individual dictionaries. Each dictionary has two or more latent components, z, which may be interpreted as spectral vectors from the given dictionary. The variable F indicates a frequency or frequency band. The spectral vector z of state q may be defined by the multinomial distribution P(f|z, q). It should be noted that there is a temporal aspect to the model, as indicated by t. In any given time frame, only one of the states is active. The given magnitude spectrogram at a time frame is modeled as a linear combination of the spectral vectors of the corresponding dictionary (or state) q. At time t, the weights are determined by the multinomial distribution $P(z_t|q_t)$.

In some embodiments, modeling a given time frame with one (of many) dictionaries rather than using a single large dictionary globally may address the non-stationarity of audio signals. For example, if an audio signal dynamically changes towards a new state, a new—and perhaps more appropriate—dictionary may be used. The temporal structure of these changes may be captured with a transition matrix, which may be defined by $P(q_{t+1}|q_t)$. The initial state probabilities (priors)

may be defined by $P(q_1)$. A distribution of the energy of a given state may be defined as $P(v|q)$ and modeled as a Gaussian distribution.

Based on this model, an overall generative process may be as follows:

1. Set t=1 and choose a state according to the initial state distribution $P(q_1)$.
2. Choose the number of draws (energy) for the given time frame according to $P(v_t|q_t)$
3. Repeat the following steps $v_t$ times:
   (a) Choose a latent component according to $P(z_t|q_t)$.
   (b) Choose a frequency according to $P(f_t|z_t, q_t)$.
4. Transition to a new state $q_{t+1}$ according to $P(q_{t+1}|q_t)$
5. Set t=t+1 and go to step 2 if t<T.

Word Models

Given an instance of a word, the parameters of all the distributions of the N-HMM may be estimated using the expectation-maximization (EM) algorithm or other suitable technique. In various embodiments, word models may be learned from multiple instances of the given word. The E step of the EM algorithm may be computed separately for each instance of the word. The E step gives the marginalized posterior distributions $P_t^{(k)(z,q|f,\bar f)}$ and $P_t^{(k)}(q_t,q_{t+1}|\bar f)$ for each instance k of the given word. Using the EM algorithm for illustration purposes, the E step may be computed as follows:

$$P_t^{(k)}(z_t, q_t \mid f_t, \bar f) = \frac{\alpha^{(k)}(q_t)\beta^{(k)}(q_t)}{\sum_{q_t} \alpha^{(k)}(q_t)\beta^{(k)}(q_t)} P^{(k)}(z_t \mid f_t, q_t) \quad \text{Eq. (2)}$$

where $$P^{(k)}(z_t \mid f_t, q_t) = \frac{P^{(k)}(z_t \mid q_t)P(f_t \mid z_t, q_t)}{\sum_{z_t} P^{(k)}(z_t \mid q_t)P(f_t \mid z_t, q_t)} \quad \text{Eq. (3)}$$

Because the magnitude spectrogram is modeled as a histogram, its entries should be integers. To account for this, in some embodiments, a scaling factor γ may be used. In Equation (2), $P_t^{(k)}(z,q|f,\bar f)$ is a posterior distribution used to estimate dictionary elements and weights vectors. Also, $\bar f$ denotes the observations across all time frames—i.e., the entire spectrogram. It should be noted that $f_t$ is part of $\bar f$. It is however mentioned separately to indicate that the posterior over $z_t$ and $q_t$ may be computed separately for each $f_t$.

Forward variables $\alpha(q_t)$ and backward variables $\beta(q_t)$ may be computed using the likelihoods of the data, $P(f_t|q_t)$, for each state. These likelihoods may then be computed as follows:

$$P^{(k)}(f_t \mid q_t) = \prod_{f_t} \left( \sum_{z_t} P(f_t \mid z_t, q_t) P^{(k)}(z_t \mid q_t) \right)^{\gamma V^{(k)}_{f_t}} \quad \text{Eq. (4)}$$

where $f_t$ represents the observations at time t, which is the magnitude spectrum at that time frame.

Dictionary elements and their respective weights may be estimated in the M step of the EM algorithm. A separate weights distribution may be computed separately for each instance k as follows:

$$P_t^{(k)}(z_t \mid q_t) = \frac{\sum_{f_t} V_{ft}^{(k)} P_t^{(k)}(z_t, q_t \mid f_t, \bar f)}{\sum_{z_t}\sum_{f_t} V_{ft}^{(k)} P_t^{(k)}(z_t, q_t \mid f_t, \bar f)}, \quad \text{Eq. (5)}$$

where $V_{ft}^{(k)}$ is the spectrogram of instance k. A single set of dictionaries of spectral components and a single transition matrix may be estimated using the marginalized posterior distributions of all instances as follows:

$$P(f \mid z, q) = \frac{\sum_k \sum_t V_{ft}^{(k)} P_t^{(k)}(z, q \mid f, \bar f)}{\sum_f \sum_k \sum_t V_{ft}^{(k)} P_t^{(k)}(z, q \mid f, \bar f)}, \quad \text{Eq. (6)}$$

$$P(q_{t+1}, q_t) = \frac{\sum_k \sum_{t=1}^{T-1} P_t^{(k)}(q_t, q_{t+1} \mid \bar f)}{\sum_{q_{t+1}} \sum_k \sum_{t=1}^{T-1} P_t^{(k)}(q_t, q_{t+1} \mid \bar f)}. \quad \text{Eq. (7)}$$

$P(f|z,q)$ may represent spectral basis vectors and $P(q_{t+1},q_t)$ may represent a transition matrix. In some embodiments, the transition matrix may be restricted to use only left to right transitions. As described herein (e.g., at FIG. 8), transitions between words may be constrained by a language model. In some embodiments, the transitions within words may likewise be constrained by a language model.

The transition matrix $P(q_{t+1}|q_t)$ and priors $P(q_1)$, as well as the mean and variance of $P(v|q)$, may each be computed based on the data as in a typical hidden Markov model algorithm. The N-HMM model may then be interpreted as an HMM in which the observation model or emission probabilities $P(f_t|q_t)$ is a multinomial mixture model:

$$P(f_t \mid q_t) = \sum_{z_t} P(f_t \mid z_t, q_t) P(z_t \mid q_t) \quad \text{Eq. (8)}$$

This implies that, for a given state q, there is a single set of spectral vectors $P(f|z,q)$ and a single set of weights $P(z|q)$. If the weights did not change across time, the observation model would then collapse to a single spectral vector per state. In the N-HMM model disclosed above, however, the weights $P(z_t|q_t)$ are configured to change with time. This flexible observation model allows variations in the occurrences of a given state.

After performing EM iterations, contributions from each may be reconstructed, for example, as shown in operation 345 of FIG. 3. The reconstruction process may be useful in certain applications such as, for example, content-aware signal processing or the like. Specifically, a reconstruction of the contribution from state $q_t$ at time t may be as follows:

$$\begin{aligned} P_t(f_t, q_t \mid \bar f, \bar v) &= P_t(q_t \mid \bar f, \bar v) P_t(f_t \mid q_t, \bar f, \bar v) \\ &= \gamma_t(q_t) P_t(f_t \mid q_t) \\ &= \gamma_t(q_t) \sum_{z_t} P_t(z_t \mid q_t) P(f_t \mid z_t, q_t) \end{aligned} \quad \text{Eq. (9)}$$

Equation (9) provides the contribution of each dictionary or state with respect to other states at each time frame. In some embodiments, Equation (9) may be modulated by the original gain of the spectrogram. As such, the a reconstruction of the construction from state q, at time t may be given by:

$$P_t(f_t, q_t \mid \overline{f}, \overline{v})\sum_f v_{ft}.$$

Note that although method 300 is described as a single source model/method, method 300 may be performed for each of multiple sources resulting in a single source model for each of the multiple sources.

Model Selection

In some embodiments, building an N-HMM model may involve a model selection process. Model selection may encompass a choice of model or user-defined parameters. In some embodiments, N-HMM model parameters may include a number of dictionaries and a number of spectral components per dictionary. These parameters may be user-defined. Additionally or alternatively, these parameters may be predetermined or automatically determined depending upon the application.

In some embodiments, Akaike information criterion (AIC), Bayesian information criterion (BIC), minimum description length (MDL), or any other suitable metric may be used for parameter evaluation. Further, metric(s) used for model optimization may be application-specific.

In various embodiments, a goal-seeking or optimization process may not always guarantee convergence to an absolute solution. For example, a goal-seeking process may exhaustively evaluate a solution space to ensure that the identified solution is the best available. Alternatively, the goal-seeking process may employ heuristic or probabilistic techniques that provide a bounded confidence interval or other measure of the quality of the solution. For example, a goal-seeking process may be designed to produce a solution that is within at least some percentage of an optimal solution, to produce a solution that has some bounded probability of being the optimal solution, or any suitable combination of these or other techniques.

N-HMM Modeling Examples

The following paragraphs illustrate N-HMM modeling for a non-limiting example depicted in FIGS. 5A-E, respectively. In the illustrated example, the input is a spectrogram. It should be understood, however, that in other scenarios a time-domain signal may be received and processed to produce a time-frequency representation or spectrogram.

Figure 5A:
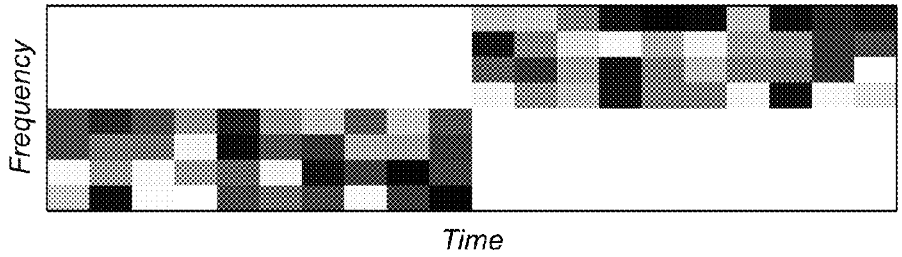
FIGS. 5A-E are graphical representations of spectrograms and model parameters corresponding to an N-HMM modeling example, according to some embodiments.

Referring to FIGS. 5A-E, graphical representations of a spectrogram and N-HMM model parameters corresponding to a first N-HMM modeling example are illustrated. Specifically, FIG. 5A shows a simulated spectrogram. In this particular example, the spectrogram was used as the input data to an algorithm or method similar to that depicted in FIG. 3. The illustrative histogram has eight frequencies and twenty time frames. It may be seen that the data in the first ten time frames are quite similar (energy only in the low frequencies), suggesting that it may be explained by a dictionary or state. Similarly, the data in the last ten time frames are quite similar (energy only in the high frequencies), suggesting that it may be explained by another dictionary. Note that the example of FIGS. 5A-5E illustrates the spectrogram and model parameters corresponding to a single instance of a spectrogram and not a word level model using multiple instances of a word.

Figure 5B:
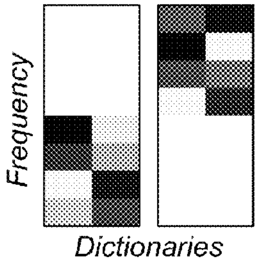

In FIG. 5B, graphical representations of two dictionaries are illustrated for the N-HMM modeling example. In the illustrated example, each dictionary has two spectral components. These dictionaries were obtained using the techniques described above, and each models a different segment of the data. Specifically, the first dictionary may be used to model the first ten time frames of the spectrogram, and the second dictionary may be used to model the last ten time frames of the spectrogram. Each time frame of the spectrogram may be modeled as a linear combination of the spectral components in one of the dictionaries. In this particular example it should be noted that, when looking at the spectral components in a given dictionary, do not tend to have a high (or low) energy at the same frequency. Either one of the components has a high energy and the other component has a low energy at a given frequency, or both components have a moderate energy. In other words, the spectral components in a given dictionary explain different aspects of the spectrogram.

Figure 5C:
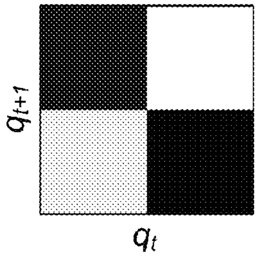

Referring now to FIG. 5C, a graphical representation of a transition matrix is depicted for the first N-HMM modeling example. As may be seen in the representation, the probability of remaining in a given state (state persistence) is high. This may be seen in the strong diagonal of the transition matrix. It may also be seen that at one of the time frames, there is a transition from state 1 to state 2. This corresponds to the small non-zero probability of $P(q_{t+1}=2|q_t=1)$ in the transition matrix. In fact, that probability is 0.1, which corresponds to there being a transition to state 2 in one out of the ten occurrences of state 1. Meanwhile, $P(q_{t+1}=1|g_t=2)=0$. This indicates that there is no transition from state 2 to state 1.

Figure 5D:
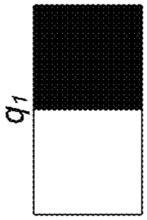
Figure 5E:
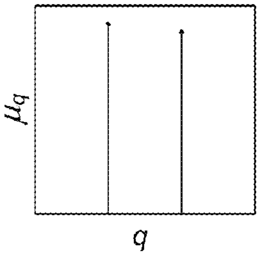

FIG. 5D shows initial state probabilities calculated for the first N-HMM modeling example. In this case, the data starts in state 1 with a probability of 1. FIG. 6E shows energy parameters for each dictionary. As confirmed by visual inspection, each of the energy states has a similar energy weight or level. The mean of the energy distribution that corresponds to each state, $\mu_q$, is therefore also similar.

Mixed Sources

In some embodiments, signal analysis module 200 of FIG. 2 may implement a mixed source model such as described in this section. In the paragraphs that follow, a language informed non-negative factorial hidden Markov model (N-FHMM) is disclosed. In some embodiments, the N-FHMM model may be suitable for modeling sound mixtures. This model may be employed, for example, to perform source separation or the like.

An N-FHMM Model

In some embodiments, an N-FHMM may model each column of a time-frequency representation or spectrogram as a linear combination of spectral components of a dictionary. For example, in illustrative N-FHMM models, each source may have multiple dictionaries, and each dictionary of a given source may correspond to a state of that source. In a given time frame, each source may be in a particular state. Therefore, each source may be modeled by a single dictionary in that time frame. The sound mixture may then be modeled by a dictionary that is the concatenation of the active dictionaries of the individual sources.

In embodiments in which word level models (N-HMMs) were generated for a source, the N-HMMs may be combined into a single source dependent N-HMM. The combining may be performed by combining the dictionaries and by constructing a large transition matrix that includes each individual transition matrix. The transition matrix corresponding to each individual word may remain the same; however, the transitions between words may be constrained according to high level information (e.g., language model). Each state of the source dependent N-HMM may correspond to a specific dictionary for that source. Therefore, the single source dependent N-HMM may include all dictionaries for all of the modeled words. The single N-HMM for a source may be combined together with the single N-HMM for another source. For example, models of individual sources may be combined into a model of sound mixtures, which may be used, for example, for source separation.

Figure 6:
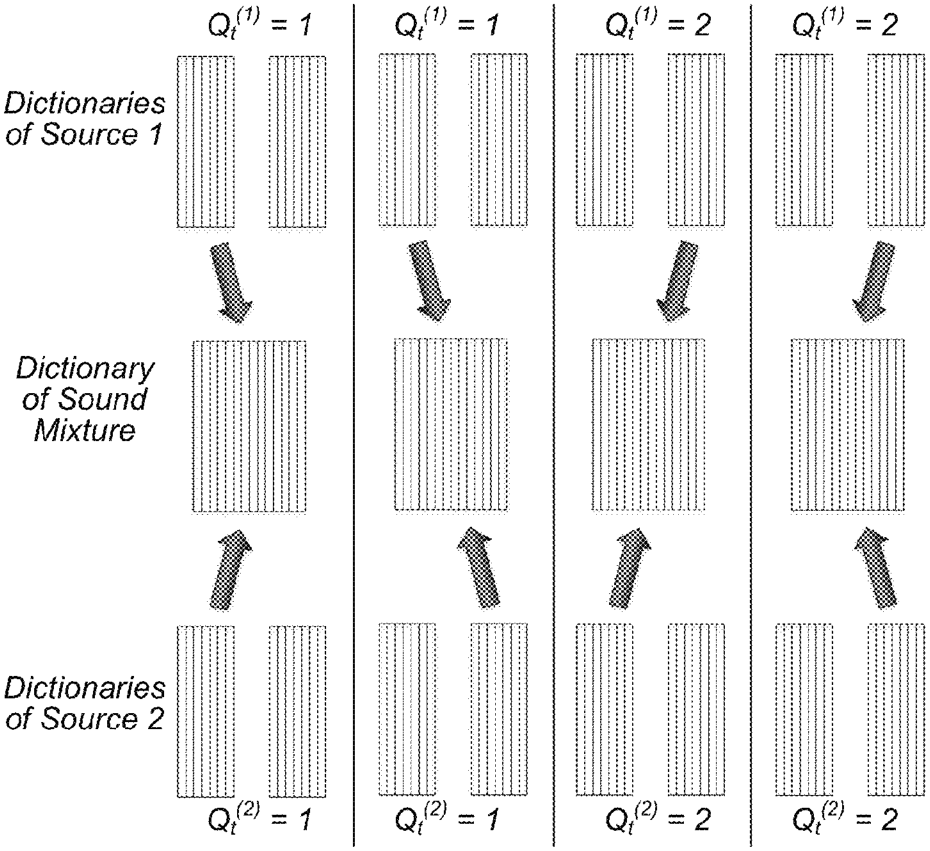
FIG. 6 is a diagram of different combinations of dictionaries that may be used to model a time frame using a non-negative factorial hidden Markov model (N-FHMM) according to some embodiments.

Referring to FIG. 6, a diagram of different combinations of dictionaries that may be used to model a time frame using the N-FHMM is depicted according to some embodiments. Given N-HMMs of multiple sources, the N-HMMs can be combined into an N-FHMM. For instance, the dictionaries and transition matrices may be combined into the N-FHMM. Two sources, each having two dictionaries, are depicted in FIG. 6. As shown, a given time frame may be explained using any one dictionary of the first source and any one dictionary of the second source. The given time frame may be modeled using a linear combination of the spectral components of the two appropriate dictionaries. Generally, if each source has N states, the sound mixture may be explained with any one of the $N^2$ possible combinations of dictionaries in that time frame. In the simple example of FIG. 6, there are a total of 4 possible combinations of the dictionaries.

Figure 7:
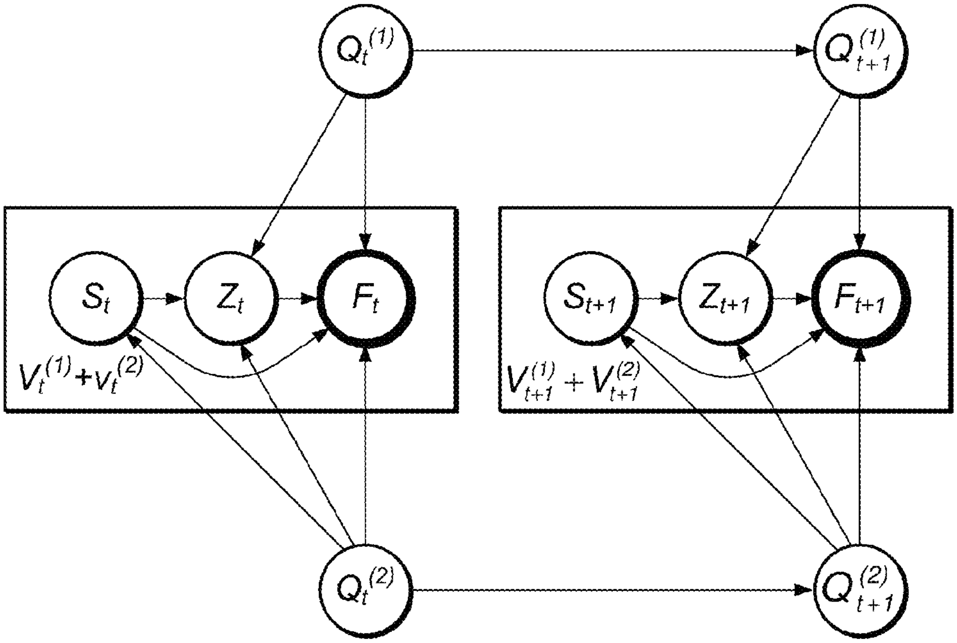
FIG. 7 is a graphical representation of an N-FHMM model for two or more sources according to some embodiments.

With reference to FIG. 7, a graphical representation of an N-FHMM model for two sources is depicted according to some embodiments. In some embodiments, an N-FHMM model combines multiple N-HMMs of single sources. In the generative process, for each draw of each time frame, a source may be selected and then the latent component may be chosen. Here, as in FIG. 4, $F_t$ and $F_{t+1}$ represent observed random variables, and other nodes represent hidden random variables. An N-HMM can be seen in the upper half of the graphical model and another one can be seen in the lower half. The interaction model (of the two sources) introduces a new variable $s_t$ that indicates the ratio of the sources at a given time frame. In a given time frame t, each source may be modeled or explained by one of its dictionaries. Therefore, a given mixture of two sources, for example, may be modeled by a pair of dictionaries, $\{q_t^{(1)},q_t^{(2)}\}$, one from each source (superscripts indicate the source). $P(s_t|q_t^{(1)},q^{(2)})$ is a Bernoulli distribution that depends on the states of the sources at the given time frame. For a given pair of dictionaries, a mixture spectrum may be defined by the following interaction model:

$$P(f_t \mid q_t^{(1)} \cdot q_t^{(2)}) = \sum_{s_t} \sum_{z_t} P\left(f_t \mid z_t, s_t \cdot q_t^{(s_t)}\right) P(z_t, s_t \mid q_t^{(1)} \cdot q_t^{(2)})| \qquad \text{Eq. (10)}$$

where $P(f_t|z_t,s_t,q^{(st)})$ is spectral component $z_t$ of state $q_t^{(st)}$ of source $s_t$.

In other words, in some embodiments, the mixture spectrum may be modeled as a linear combination of individual sources, which in turn may each be modeled as a linear combination of spectral vectors from their respective dictionaries. This allows modeling the mixture as a linear combination of the spectral vectors from the given pair of dictionaries.

Figure 8:
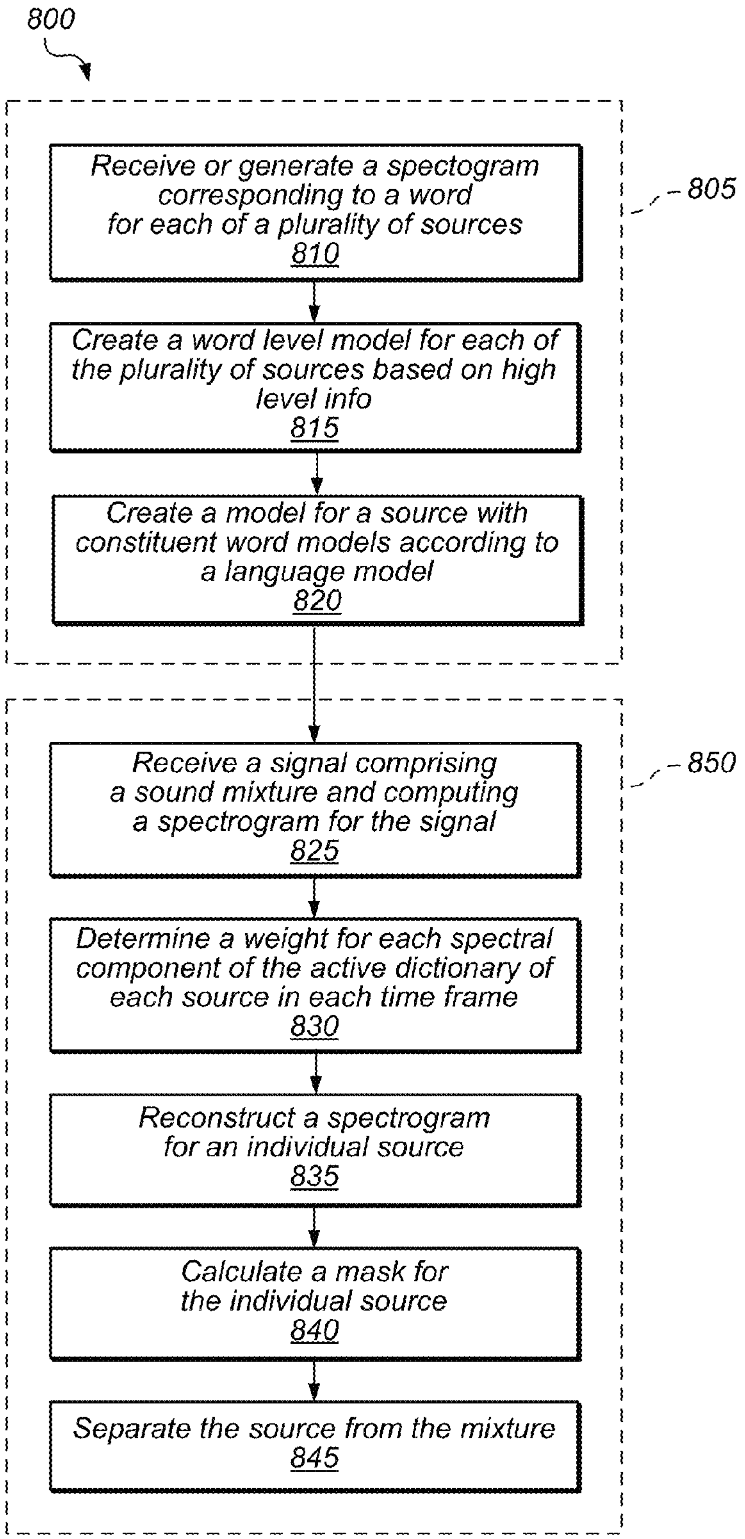
FIG. 8 is a flowchart of a method for a language informed non-negative factorial hidden Markov model (N-FHMM) for mixed sources according to some embodiments.

Referring now to FIG. 8, method 800 for a non-negative factorial hidden Markov model (N-FHMM) for mixed sources is depicted according to some embodiments. For example, method 800 may be performed, at least in part, by signal analysis module 200 of FIG. 2. Similarly to method 300 of FIG. 3, method 800 may be split into two stages: training stage 805 and application stage 850. Although method 800 is illustrated showing application stage 850 immediately following training stage 805, it should be noted that these stages may be independently performed at different times and by different entities. In some implementations, training stage 805 may take place "offline" based on training data, and application stage 850 may be executed "online" based on data desired to be processed. In other implementations, both training stage 805 and application stage 850 may be executed online.

At 810 of training phase 805, method 800 may receive or otherwise calculate a time-frequency representation or histogram for each of a plurality of sources. In some embodiments, each spectrogram may be calculated based on a time-varying signal, and the signal may be a previously recorded training signal or other a priori source information. Additionally or alternatively, each signal may be a portion of a live signal being received at signal analysis module 200.

At 815, method 800 may create N-HMM models for each of the plurality of sources. In some embodiments, a given model for a given source may include several dictionaries that explain an entire spectrogram such that a given time frame of the spectrogram may be explained mainly by a single dictionary. In these cases, multiple segments in different parts of the spectrogram may be explained by the same dictionary. Additionally or alternatively, each model may include a dictionary for each time frame of its corresponding source's spectrogram, where each dictionary includes one or more spectral components. Each N-HMM model may also include a transition matrix containing the probabilities of transition between dictionaries. Moreover, word level N-HMM models corresponding to each source may be generated for each of a plurality of words.

At 820, method 800 may combine the word level N-HMMs for each source into a source specific composite N-HMM, including the dictionaries and transition matrices from each word level N-HMM. The combined transition matrix may be constrained according to high level information. For example, transition between words may be constrained according to a language model. In some embodiments, operation 820 may involve operations similar to those of training phase 305 of N-HMM method 300 for each source.

At 825 of application phase 850, method 800 may receive a time-varying signal comprising a sound mixture generated by one or more of the previously modeled sources. Additionally or alternatively, operation 825 may compute a spectrogram of a received time-varying signal. Then, at 830, method 800 may determine a weight for one or more of the sources based, at least in part, on the spectrogram. For example, method 800 may calculate or estimate weights for each spectral component of the active dictionary of each source in each segment or time frame of the spectrogram. The "active dictionary" may be, for example, a dictionary that adequately and/or better explains a given source's behavior in a given segment.

In some embodiments, the likelihood of every possible state combination (e.g., pair for two source example) may be computed at every time frame. This may lead to large computational complexity of the N-FHMM that may be exponential in the number of sources. In one embodiment, state pairs with a small probability may be pruned such that they are not computed at a given time frame. For example, state pairs whose posterior probability $\gamma(q_t^{(1)},q_t^{(2)})$ is below a threshold (e.g., a predetermined threshold) may be pruned. As one example, the threshold may be set to −10000 in the log domain. In the experiments described below, such a threshold resulted in pruning out around 99% of the state pairs, greatly reducing computational complexity.

At 835, method 800 may reconstruct spectrograms corresponding to contributions of each dictionary for each selected source based on the model(s) and the estimated weight(s).

And at operation 840 method 800 may calculate a mask for one or more of the sources based on the reconstruction operation.

For example, to perform source separation at operation 845, the mask may be applied to the mixture to isolate contributions from its corresponding source. In some embodiments, $P(z_t, s_t|q_t^{(1)}, q_t^{(2)})$ may be used rather than dealing with $P(z_t|s_t, q_t^{(1)}, q_t^{(2)})$ and $P(s_t|q_t^{(1)}, q_t^{(2)})$ individually so that there is a single set of mixture weights over both sources. These operations are discussed in more detail below.

Source Separation

As mentioned above in connection with FIG. 8, in some embodiments, to perform separation, mixture weights $P(z_t, s_t|q_t^{(1)}, q_t^{(2)})$ may be estimated for each pair of states or dictionaries. Although only two sources are used in the equations that follow, it should be understood that this technique (and other disclosed techniques) is similarly applicable to three or more sources. Further, weight estimation may be performed by any suitable method such as, for example, an EM method. In that case, the E step may be computed as follows:

$$P(z_t, s_t, q_t^{(1)}, q_t^{(2)} \mid f_t, \bar{f}) = \frac{\alpha(q_t^{(1)}, q_t^{(2)})\beta(q_t^{(1)}, q_t^{(2)})}{\sum_{q_t^{(1)}}\sum_{q_t^{(2)}} \alpha(q_t^{(1)}, q_t^{(2)})\beta(q_t^{(1)}, q_t^{(2)})} P(z_t, s_t \mid f_t, q_t^{(1)}, q_t^{(2)}) \quad \text{Eq. (11)}$$

where:

$$P(z_t, s_t \mid f_t, q_t^{(1)}, q_t^{(2)}) = \frac{P(f \mid z_t, s_t, q_t^{(s_t)}) P(z_t, s_t \mid q_t^{(1)}, q_t^{(2)})}{\sum_{s_t}\sum_{z_t} P(f \mid z_t, s_t, q_t^{(s_t)}) P(z_t, s_t \mid q_t^{(1)}, q_t^{(2)})} \quad \text{Eq. (12)}$$

$\alpha(q_t^{(1)}, q_t^{(2)})$ and $\beta(q_t^{(1)}, q_t^{(2)})$ may be computed, for example, with a two-dimensional forward-backward algorithm using the likelihoods of the data $P(f_t|q_t^{(1)}, q_t^{(2)})$ for each pair of states. These likelihoods may be computed as follows:

$$P(f_t \mid q_t^{(1)}, q_t^{(2)}) = \prod_{f_t}\left(\sum_{s_t}\sum_{z_t} P(f_t \mid z_t, s_t, q_t^{(s_t)}) P(z_t, s_t \mid q_t^{(1)}, q_t^{(2)})\right)^{\gamma V_{ft}} \quad \text{Eq. (13)}$$

Accordingly, the weights may be computed in the M step as follows:

$$P(z_t, s_t \mid q_t^{(1)}, q_t^{(2)}) = \frac{\sum_{f_t} V_{ft} P(z_t, s_t, q_t^{(1)}, q_t^{(2)} \mid f_t, \bar{f})}{\sum_{s_t}\sum_{z_t}\sum_{f_t} V_{ft} P(z_t, s_t, q_t^{(1)}, q_t^{(2)} \mid f_t, \bar{f})} \quad \text{Eq. (14)}$$

Once the weights are estimated using the EM algorithm, a proportion of the contribution of each source at each time-frequency bin may be computed as follows:

$$P(s_t \mid f_t) = \frac{\sum_{q_t^{(1)}}\sum_{q_t^{(2)}} P(q_t^{(1)}, q_t^{(2)} \mid \bar{f}) \sum_{z_t} P(f \mid z_t, s, q_t^{(s)}) P(z_t, s \mid q_t^{(1)}, q_t^{(2)})}{\sum_{s_t}\sum_{q_t^{(1)}}\sum_{q_t^{(2)}} P(q_t^{(1)}, q_t^{(2)} \mid \bar{f}) \sum_{z_t} P(f \mid z_t, s, q_t^{(s)}) P(z_t, s \mid q_t^{(1)}, q_t^{(2)})} \quad \text{Eq. (15)}$$

where:

$$P(q_t^{(1)}, q_t^{(2)} \mid \bar{f}) = \frac{\alpha(q_t^{(1)}, q_t^{(2)})\beta(q_t^{(1)}, q_t^{(2)})}{\sum_{q_t^{(1)}}\sum_{q_t^{(2)}} \alpha(q_t^{(1)}, q_t^{(2)})\beta(q_t^{(1)}, q_t^{(2)})} \quad \text{Eq. (16)}$$

In some embodiments, Equation 15 may provide a soft mask that may be used to modulate the mixture spectrogram to obtain separated spectrograms of individual sources.

In Equation 15, the contributions of every pair of states are combined. This implies that the reconstruction of each source has contributions from each of its dictionaries. In some embodiments, however, $P(q_t^{(1)}, q_t^{(2)}|\bar{f})$ tends to zero for all but one $\{q_t^{(1)}, q_t^{(2)}\}$ pair, effectively using only one dictionary per time frame per source. This may be the case when the dictionaries of individual source models are learned in such a way that each time frame is explained almost exclusively by one dictionary. In some embodiments, the provision of having a small non-zero contribution from more than one dictionary may be helpful in modeling the decay of the active dictionary in the previous time frame.

Using the language model allows the technique to determine which dictionary of a number of dictionaries should be used to explain each source. Once the dictionary of each source is determined for a given time frame, method 800 may fit the corresponding spectral components to the mixture data to obtain the closest possible reconstruction of the mixture. Such flexibility after determining the appropriate dictionary may help avoid excessive artifacts and may reduce computation time and complexity. Moreover, using word level models and high level information with N-HMM techniques may result in improved source separation.

EXPERIMENTS

The source separation techniques described above were tested in speech separation experiments based on publicly available test data (including a language model). Analysis on a subset of the test data, which did not include ground truth data, was performed. Source separation metrics are typically measured against ground truth data; therefore, to account for the lack of ground truth data, the data was divided into a training set and a test set. N-HMMs were trained for 10 speakers using 450 of the 500 sentences from the training set of each speaker. The remaining 50 sentences were used to construct the test set. The training sentences were segmented into words in order to learn individual word models. One state per phoneme was used. The word models of a given speaker were combined into a single N-HMM according to the language model, as described herein. For each speaker, an N-HMM of 127 states was used resulting in 16,129 possible state pairs. Those pairs were pruned with a threshold of −10000 in the log domain resulting in less than 250 possible state pairs being considered in most time frames. As a result, the computation complexity was linear, and not exponential, in the number of sources.

Speech separation was performed using the N-FHMM on speakers of different genders and the same gender. For both categories, 10 test mixtures were constructed from the test set. The mixing was done at 0 dB. The source separation performance was evaluated using the BSS-EVAL metrics. As a comparison, separation was also performed using a non-negative spectrogram factorization technique (PLCA). The same training sets and test sets were used when using PLCA; however, the training data of a given speaker was simply concatenated and a single dictionary was learned for that speaker.

The results of the analysis are shown in Table 2. In Table 2, signal-to-interference ratio (SIR) is a measure of the suppression of an unwanted source, signal-to-artifact ratio (SAR) is a measure of artifacts (such as, for example, musical noise) that may be introduced by the separation process, and signal-to-distortion ratio (SDR) is an overall measure of performance that accounts for both SDR and SIR.

The disclosed technique outperformed PLCA in all of the metrics for both gender categories. Specifically, a 7-8 dB improvement is shown in source to interference ratio (SIR) while still maintaining a higher source to artifacts ratio (SAR). Thus, higher amounts of separation occur in the disclosed technique as compared to PLCA, while introducing fewer artifacts. The source to distortion ratio (SDR), which reflects both the SIR and SAR, is likewise improved over PLCA. Moreover, when performance of the N-FFIMM is compared between the two gender categories, only a small deterioration of performance resulted from the different gender to the same gender case (0.5-1 dB in each metric). With PLCA, however, a greater deterioration in SIR and SDR (2-3 dB) resulted. With N-FHMM, the language model may help disambiguate the sources.

TABLE 2

Source separation performance of the N-FHMM and PLCA

| | SIR | SAR | SDR |
|---|---|---|---|
| Diff Gender | | | |
| N-FHMM | 14.91 | 10.29 | 8.78 |
| PLCA | 7.96 | 9.08 | 4.86 |
| Same Gender | | | |
| N-FHMM | 13.88 | 9.89 | 8.24 |
| PLCA | 5.11 | 8.77 | 2.85 |

The results of the source separation experiments show various benefits of the disclosed techniques over PLCA in the overall performance in terms of SDR. For example, there is a large improvement in the actual suppression of the unwanted source (SIR), etc., yet there are fewer introduced artifacts.

The various methods as illustrated in the figures and described herein represent example embodiments of methods. The methods may be implemented in software, hardware, or a combination thereof. The order of method may be changed, and various elements may be added, reordered, combined, omitted, modified, etc. Various modifications and changes may be made as would be obvious to a person of ordinary skill in the art having the benefit of this specification. It is intended that the embodiments embrace all such modifications and changes and, accordingly, the above description to be regarded in an illustrative rather than a restrictive sense.

What is claimed is:

1. A non-transitory computer-readable storage medium storing program instructions, the program instructions being computer-executable to implement:

for a first source, generating a model for each word of a plurality of words, each model includes including:

a plurality of dictionaries, each of the plurality of dictionaries including one or more spectral components; and probabilities of transition between the plurality of dictionaries; and constraining the models according to high level information that defines valid transitions, the constrained models being usable to perform source separation on a sound mixture that includes multiple sources.

2. The non-transitory computer-readable storage medium of claim 1, wherein the high level information is a language model that defines a corpus of words and a plurality of valid sequences of the words of the corpus.

3. The non-transitory computer-readable storage medium of claim 1, wherein said generating the model for each word includes performing a non-negative hidden Markov technique.

4. The non-transitory computer-readable storage medium of claim 1, wherein the program instructions are further computer-executable to implement combining the models into a single source dependent model, wherein said constraining the models includes constraining transitions between the models of the single source dependent model according to the high level information.

5. The non-transitory computer-readable storage medium of claim 1, wherein the program instructions are further computer-executable to implement:

for a second source, generating another model for each word of the plurality of words; and constraining the other models according to the high level information.

6. The non-transitory computer-readable storage medium of claim 5, wherein the program instructions are further computer-executable to implement combining the models and the other models into a single composite model.

7. The non-transitory computer-readable storage medium of claim 6, wherein said performing source separation includes:

receiving the sound mixture that includes the first and second sources;

receiving the single composite model; and for each time frame of the sound mixture, estimating a weight of each of the first and second sources in the sound mixture based on the single composite model.

8. The non-transitory computer-readable storage medium of claim 6, wherein the program instructions are further computer-executable to implement pruning the single composite model according to a threshold.

9. The non-transitory computer-readable storage medium of claim 1, wherein said generating the model of each word is based on multiple instances of the respective word.

10. The non-transitory computer-readable storage medium of claim 1, wherein a portion of a given word of the plurality of words is represented by a linear combination of one or more spectral components of one of the respective word's corresponding dictionaries.

11. A non-transitory computer-readable storage medium storing program instructions, the program instructions being computer-executable to implement:

receiving a sound mixture including a first source and a second source;

receiving a model including:

a first plurality of dictionaries corresponding to a first source, the first plurality of dictionaries including multiple dictionaries for each word of a plurality of words;

a first transition matrix corresponding to the first source, the transition matrix including probabilities of transition among the first plurality of dictionaries, at least some of the probabilities of transition are based on high level information that defines valid transitions;

a second plurality of dictionaries corresponding to the second source, the second plurality of dictionaries including multiple other dictionaries for each word of the plurality of words; and a second transition matrix corresponding to the second source, the second transition matrix including probabilities of transition among the second plurality of dictionaries, at least some of the probabilities of transition in the second transition matrix being based on the high level information; and calculating contributions to the sound mixture from respective plurality of dictionaries for each of the first and second sources, said calculating is based on the model.

12. The non-transitory computer-readable storage medium of claim 11, wherein said estimating is performed for each time frame of the sound mixture.

13. The non-transitory computer-readable storage medium of claim 11, wherein said calculating a contribution of the first plurality of dictionaries and a contribution of the second plurality of dictionaries to the sound mixture, wherein the high level information is a language model that defines valid grammar.

14. The non-transitory computer-readable storage medium of claim 11, wherein the model is a non-negative factorial hidden Markov model.

15. The non-transitory computer-readable storage medium of claim 11, wherein the program instructions are further computer-executable to implement:

generating a mask for the first source based on the estimated contributions from the first source's respective dictionaries; and applying each mask to the sound mixture to separate the respective source from the sound mixture.

16. A method, comprising:

for each source of a plurality of sources, generating a plurality of word level models, each word level model corresponding to a respective one word of a plurality of words, each word level model including:

a plurality of dictionaries, each of the plurality of dictionaries including one or more spectral components, and probabilities of transition between the dictionaries;

for each source, combining the word level models into a single source specific model; and constraining the single source specific models according to high level information that defines valid transitions, the constrained single source specific models being usable to perform source separation on a sound mixture that includes multiple sources.

17. The method of claim 16, wherein the high level information is a language model that defines a corpus of words and a plurality of valid sequences of the words of the corpus.

18. The method of claim 16, wherein said generating the plurality of word level models includes performing a non-negative hidden Markov technique.

19. The method of claim 16, wherein each word level model is based on multiple instances of the corresponding respective word.

20. The method of claim 16, wherein said constraining the single source specific models includes constraining transitions between word level models in the single source dependent model according to the high level information.

* * * * *